United States Patent [19]

Nouchi et al.

[11] 4,127,884
[45] Nov. 28, 1978

[54] MAGNETIC HEAD AND METHOD OF MAKING THE SAME

[75] Inventors: Norimoto Nouchi, Katano; Kenji Kanai, Neyagawa; Nobuyuki Kaminaka, Moriguchi; Noboru Nomura, Kyoto, all of Japan

[73] Assignee: Matsushita Electric Industrial Co., Ltd., Kadoma, Japan

[21] Appl. No.: 782,247

[22] Filed: Mar. 28, 1977

[30] Foreign Application Priority Data

Mar. 30, 1976 [JP] Japan .................................. 51-35847

[51] Int. Cl.² .............................................. G11B 5/30
[52] U.S. Cl. .................................... 360/119; 360/113; 360/123; 360/127; 428/900
[58] Field of Search ............... 360/113, 122, 123, 126, 360/127, 114, 120, 121; 427/127, 129, 131; 156/654, 656, 659, 664; 428/156, 539, 900

[56] References Cited

U.S. PATENT DOCUMENTS

| | | | |
|---|---|---|---|
| 3,908,194 | 9/1975 | Romanlin | 360/113 |
| 3,987,485 | 10/1976 | Sugaya et al. | 360/113 |

Primary Examiner—Stanley S. Silverman
Attorney, Agent, or Firm—Stevens, Davis, Miller & Mosher

[57] ABSTRACT

A thin film type magnetic head, in which a conductor is accommodated within a groove formed in part of a ferromagnetic substrate constituting part of a magnetic core, and a ferromagnetic film is disposed on the conductor to constitute part of the magnetic core. With this structure, it is possible to reduce the number of steps of layers constituting the magnetic head for reducing damage or breakage of the stepped portions of the layers and also increase the core gap in a central part of the core so as to reduce leakage flux even in the thin film magnetic head as well as bettering dissipation of Joule heat produced in the conductor.

6 Claims, 11 Drawing Figures

MAGNETIC HEAD AND METHOD OF MAKING THE SAME

BACKGROUND OF THE INVENTION

1. Field of the Invention

This invention relates to improvements in thin film type magnetic heads and a method of manufacture of the same.

2. Description of the Prior Art

Recently, a magnetic head in which the core section, winding section and gap section are each formed by using thin film formation techniques such as vapor deposition, sputtering and electrodeposition or the pattern formation techniques such as etching and electro-forming, or a magnetic head in which a magnetic reluctance element is formed from a ferromagnetic material, have been proposed to replace a magnetic head in which the core section is formed from ferrite or a metal by using mechanical processing techniques, the winding is provided in a winding groove and a non-magnetic material is provided in the gap section.

An example of the former magnetic heads, a multi-winding magnetic head which is arranged in the direction of width of a recording medium, will now be described with reference to FIGS. 1 to 3. In the structures to be described hereinafter, it is assumed that the films involved therein are formed by means of thin film formation techniques such as vapor deposition, electrodeposition and sputtering and also pattern formation techniques such as etching and electro-forming.

Figure 1:
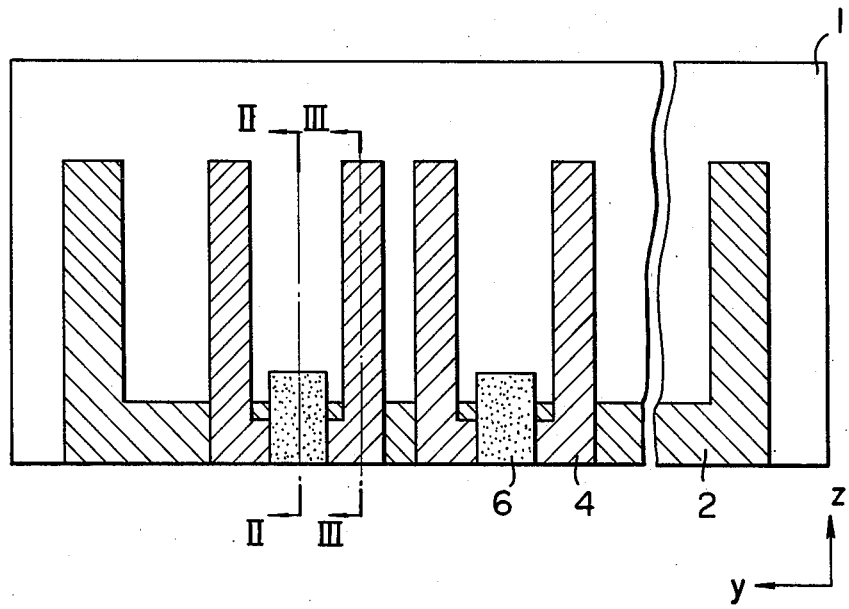
FIG. 1 is a plan view representation of a prior art multi-winding magnetic head.

A first conductive film 2 of a conductive material such as Cu, Al and Au is disposed on a flat top surface of a ferromagnetic substrate 1 of ferrite, permalloy, sendust or the like (in the direction normal to the plane of paper in FIG. 1). This film 2 serves to give a bias magnetic field to a recording medium by causing a current to flow through the film. In the case where the resistivity of the ferromagnetic substrate 1 is low, the first conductive film 2 is disposed on an insulating film such as SiO, $SiO_2$ and MgF which is previously disposed on the ferromagnetic substrate 1. In FIGS. 1 to 3, the insulating film is omitted. A non-magnetic and insulating film 3 of such material as SiO, $SiO_2$ and MgF (the x direction in FIGS. 2 and 3) is formed atop the first conductive film 2 to prevent a short-circuit of the first conductive film 2 with a second conductive film 4 and a ferromagnetic film 6 to be described later. The second conductive film 4 made of such conductive material as Al, Cu and Au is disposed on the film 3. The second conductive film 4 serves to record a signal on a recording medium 7 in co-operation with the first conductive film 2 by causing a signal current to flow through the film 4. A non-magnetic and insulating film 5 of such material as SiO, $SiO_2$ and MgF is formed on the second conductive film 4 to prevent a short-circuit between the second conductive film 4 and ferromagnetic film 6. The ferromagnetic film 6 is formed on the film 5 from a ferromagnetic material such as an Fe-Ni alloy (commonly termed permalloy), an Fe-Si alloy, an Fe-Al alloy, a ferrite, etc., and it constitutes a core section together with the aforementioned ferromagnetic substrate 1.

Figure 2:
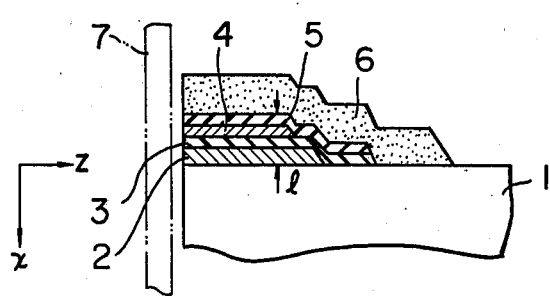
FIGS. 2 and 3 are sections taken along lines II—II and III—III in FIG. 1, respectively.
Figure 3:
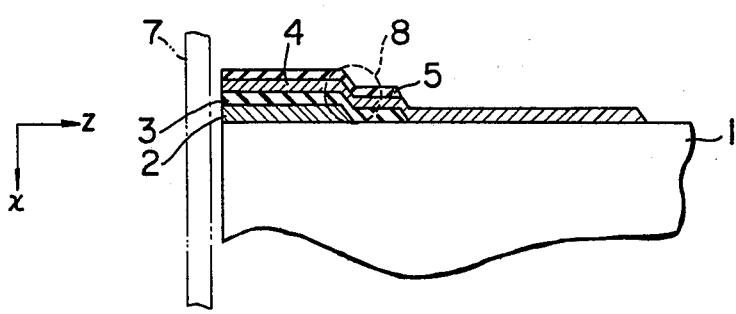

However, since the prior art magnetic head has a structure in which thin films are laminated on one another on the substrate 1 having a flat surface, as shown in FIGS. 2 and 3, it is prone to cause electric short-circuit between the first and second conductive films 2 and 4 or electric breakage of the second conductive film 4 in a stepped portion 8 as shown in FIG. 3. It has been proposed to increase the thickness of, for instance, the first conductive film 2 since it is necessary to cause a large current to flow through the film 2 (for instance a current density of 20 to 40 $mA/m^2$) for producing a bias field, but in such case the afore-mentioned problem surrounding stepped portion 8 becomes more serious. Although one might consider increasing the thickness of the non-magnetic insulating film 3, the thickness thereof cannot be extremely large due to restrictions imposed in the design of the magnetic head in the case where the film 3 shares part of the gap section of the magnetic head; thus, the above problem cannot be effectively solved by this method. Further, in the prior art magnetic head in which the bias field is generated at the time of recording a signal on the recording medium 7 by causing a large current to flow through the first conductive film 2, it is possible that Joule heat produced in the first conductive film 2 will break the film 2 or will be conducted to the ferromagnetic substrate 1 or other thin film portions (for instance the second conductive film 4 and magnetic film 6) to deteriorate the magnetic characteristics of, for example, the ferromagnetic film 6, and cause the re-crystallization of the first conductive film 2 if the film 2 is formed from Al, or the diffusion of Cr if the film is formed from an Au-Cr alloy, thus varying the resistivity of the first conductive film 2. In such a case, the stability of the structure as a magnetic head cannot be maintained. Furthermore, as a method of increasing the efficiency of the magnetic head, it has been proposed to increase the distance l within the head between the ferromagnetic film 6 and the ferromagnetic substrate 1 to thereby reduce the leakage of flux between the ferromagnetic film 6 and the ferromagnetic substrate 1. However, where thin films are formed one over another on the ferromagnetic substrate 1 having a flat surface as in the prior-art magnetic head, this method imposes limitations upon the design of the head or increases the number of the manufacturing steps, and effective solution to these problems have yet to be found.

SUMMARY OF THE INVENTION

An object of the invention is to provide a magnetic head and a method of manufacturing the same, which can solve the problems involved in the stepped portion in the prior-art magnetic head, that is, suppress or eliminate breakage or short-circuiting in films or between films constituting the magnetic head, suppress or preclude adverse effects of the Joule heat upon the constituent thin films and improve the core efficiency of the structure as the magnetic head.

DESCRIPTION OF THE PREFERRED EMBODIMENT

Figure 4:
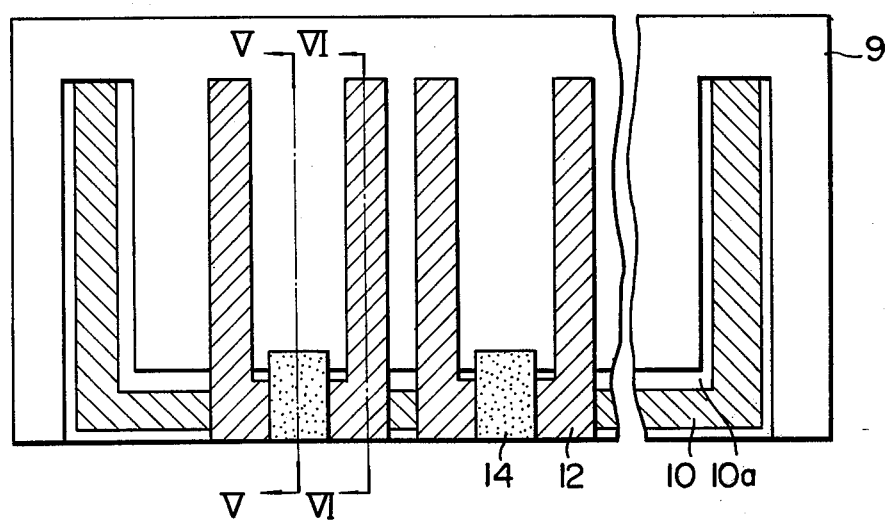
FIG. 4 is a plan view representation of an embodiment of a multi-winding magnetic head according to the present invention.
Figure 5:
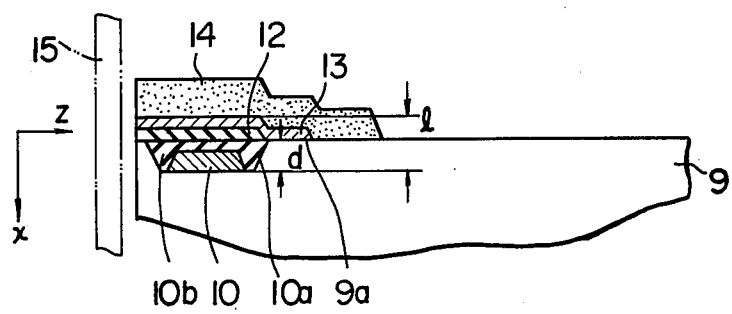
FIGS. 5 and 6 are sections taken along lines V—V and VI—VI in FIG. 4, respectively.
Figure 6:
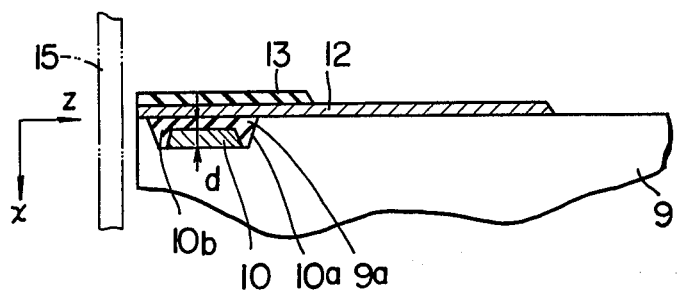

Now, the present invention will be described in detail with reference to FIGS. 4 to 6. A ferromagnetic substrate 9 of ferrite, permalloy or sendust in provided in part with a recess-like groove 10a extending substantially parallel to the direction of width of a recording medium 15 and in a strip-like form. In the groove 10a is disposed a first conductive film 10 of a conductive material such as Au, Ag and Al to a thickness smaller than the depth $d$ of the groove 10a, and also in the groove 10a inclusive of the first conductive layer 10 is disposed a non-magnetic and insulating material 10b such as a film of SiO or $SiO_2$ and an insulating glass. Then, the surfaces of the insulating material 10b and the ferromagentic substrate 9 are lapped to make a surface 9a flush with the surfaces of the groove 10a and ferromagnetic substrate 9, and a second conductive film 12 of a non-magnetic and conductive material such as Al, Au and Ag is formed atop the groove 10a (in the $x$ direction in FIGS. 5 and 6). Large current is caused to flow through the first conductive film 10 to produce a bias field, while signal current is caused to flow through the second conductive film 12 to produce a signal field. Subsequently, a non-magnetic and insulating film 13 of such material as SiO, $SiO_2$ or MgF is formed on the second conductive film 12 (in the $x$-direction in FIGS. 5 and 6) for preventing an electric short-circuit between the second conductive film 12 and a ferromagnetic film 14 to be described later. The ferromagnetic film 14, which consists of a ferromagnetic material such as Fe-Ni alloy (so-called permalloy), Fe-Si alloy, Fe-Al alloy or ferrite, is provided so as to stride the second conductive film 12 and non-magnetic insulating film 13 laminated one above another atop the area of the aforementioned groove 10a, whereby a core section is formed by the film 14 and the ferromagnetic substrate 9. Where the resistivity of the ferromagnetic substrate 9 is low or where the first conductive film has a thickness substantially equal to the depth $d$ of the groove 10a, the second conductive film 12 is disposed on an insulating film of such material as SiO, $SiO_2$ or MgF which is previously formed atop the ferromagnetic substrate 9 (in the $x$ direction in FIGS. 5 and 6).

Figure 11:
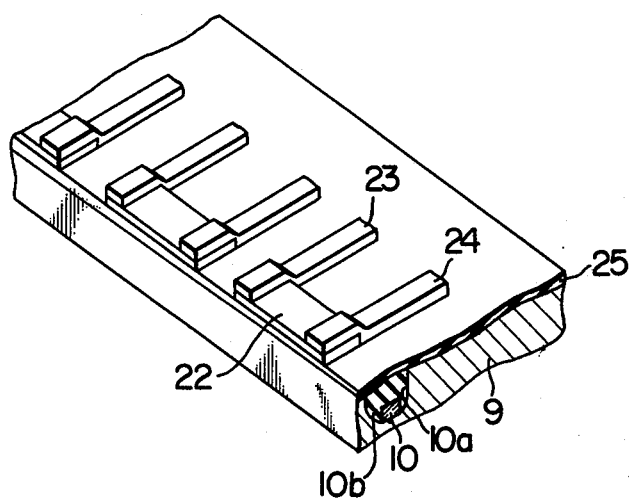
FIG. 11 is a perspective view of another embodiment of a magnetic head of the present invention.

While the above description is concerned with a multi-winding magnetic head arranged in the direction of width of the recording medium 7, the invention can also be applied to a magnetoresistive type magnetic head as shown in FIG. 11, which has a structure including a groove 10a formed in part of the ferromagnetic substrate 9 so as to extend substantially parallel to the direction of width of the recording medium 15 and in a strip-like fashion, filling the groove 10a with at least the non-magnetic conductive material 10, making the top surface of the groove 10a and the ferromagnetic substrate 9 flush with each other by lapping thereof and disposing a magnetoresistive element 22 consisting of a ferromagnetic material such as Fe-Ni alloy, Fe-Si alloy, etc. on the ferromagnetic substrate 9 and having magnetoresistive effect to extend substantially parallel to the groove, since in this case a d-c bias magnetic field can be applied through electrodes 23,24 to the element by causing d-c bias current to flow through the non-magnetic conductive material 10 for obtaining an effect to be described later. Numeral 25 denotes an electrically insulating layer mounted on the ferromagnetic substrate 9. In this embodiment, the second conductive layer 12 is substituted by the magnetoresistive element 22 and the electrodes 23 and 24 secured to opposite ends of the element 22. Also, the insulating layer 13 and the ferromagnetic layer 14 are not needed. A voltage or a resistance across the magnetoresistive element changes depending on the magnitude of the magnetic field applied thereto. Thus, the change of the magnetic field is detected by the magnetoresistive element 22. The conductive material 10 serves the roll of producing a bias magnetic field changing an operating point of the magnetoresistive element 22. Here, the substrate 9 functions as a magnetic core for collecting a magnetic flux flowing through the magnetoresistive element 22.

Figure 7:
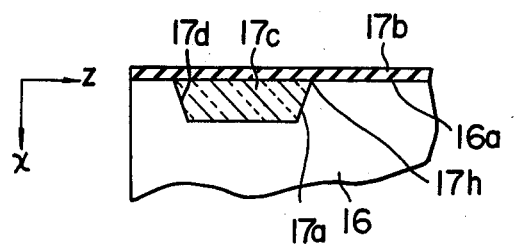
FIG. 7 is a representation of another embodiment of the invention.

Another embodiment of the invention will now be described. Referring now to FIG. 7, part of a ferromagnetic substrate 16 is provided with a recess-like groove 17a, the groove 17a is filled with a conductive glass 17c such as silver iodide silver pyophosphate glass or silver iodide silver bichromate glass, the surfaces of the glass 17c and the ferromagnetic substrate 16 are then lapped to form a flat surface 16a, a non-magnetic and insulating film 17b of such material as SiO, $SiO_2$ or MgF is then formed on the surface 16a, and the second conductive film 12, the non-magnetic and insulating film 13 and the magnetic film 14, as shown in FIGS. 4 to 6 (which are not shown in FIG. 7), are disposed on the film 17b. The film 17b is provided for the purpose of preventing an electric short-circuit of the conductive glass 17c with respect to the second conductive film 12 and the magnetic film 14. Where the resistivity of the ferromagnetic substrate 16 is low, an insulating material such as insulating glass is provided on the inner walls 17d of the recess-like groove 17a in the ferromagnetic substrate 16 for the purpose of preventing an electric short-circuit between the ferromagnetic substrate 16 and conductive glass 17c (although it is not shown in FIG. 7).

Figure 8:
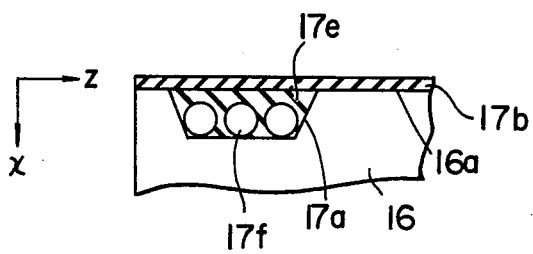
FIG. 8 is a representation of a further embodiment of the invention.

FIG. 8 shows another embodiment of the invention. In this case, part of a ferromagnetic substrate 16 is provided with a recess-like groove 17a, a plurality of wires 17f of a conductive material such as Cu and Al may be disposed in the groove 17a. The interior of the groove containing the wires 17f is then filled with an insulating glass 17e, the surfaces of the glass 17e and ferromagnetic substrate 16 are then lapped to obtain a flat surface 16a. A non-magnetic and insulating film 17b is then disposed on the surface 16a, and then the second conductive film 12, the non-magnetic and insulating film 13 and the ferromagnetic film 14, as shown in FIGS. 4 to 6 (which are not shown in FIG. 8), are laminated one above another on the film 17b.

Figure 9:
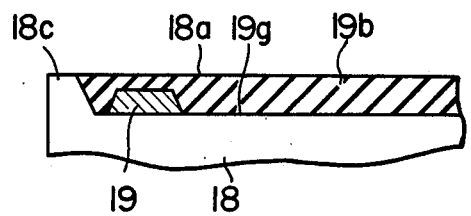
FIG. 9 is a representation of a still further embodiment of the invention.

Another structure is shown in FIG. 9, wherein a conductive material 19 is disposed on the bottom 19g of a ferromagnetic material 18 having a recess 18c, filling the groove inclusive of the conductive material 19 with an insulating glass 19b. The surfaces of the glass 19b and the ferromagnetic substrate 18 are lapped to obtain a plane surface 18a to form a lamination of the layers as mentioned above on the lapped surface 18a.

Figure 10:
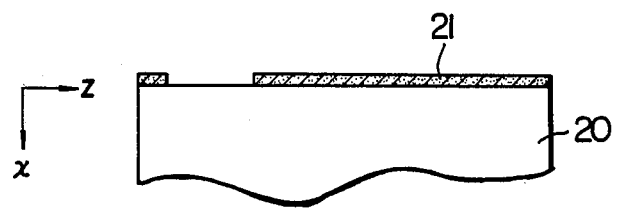
FIG. 10 is a view illustrating the way of forming a groove in accordance with the invention.

The method of forming the recess-like groove as shown in FIGS. 4 through 8 and forming the bottom as shown in FIG. 9 will now be described with reference to FIG. 10. The groove and bottom are formed in a ferromagnetic substrate 20 by depositing a metal film 21 of a material having good adhesion property with respect to the ferromagnetic substrate 20 such as Au and Cr on the ferromagnetic substrate 20 (in the x direction) by means of the thin film formation techniques such as vapor deposition, spattering, electrodeposition, etc.; rendering them into a desired shape or pattern by means of the pattern forming techniques such as photo-etching or electro-forming and etching part of the ferromagnetic material using an etching liquid, which does not dissolve the metal film 21 but dissolves only the ferromagnetic material 1, that is, the metal film 21 being used as a mask for the etching of the ferromagnetic material 20. As an example, where the metal film 21 is Au or Cu and the ferromagnetic material 20 is ferrite, an etching liquid consisting of $H_3PO_4$, HCl or HF is effective. In addition, it is possible to form the metal film of a desired shape by using a thin film mask on the metal film or form a coating of a desired resist pattern or shape on the ferromagnetic substrate 20 to form the etched groove 20 or bottom 21 with the etching liquid.

As has been described in the foregoing, the magnetic head according to the invention uses as a substrate the ferromagnetic material 1, which is formed by disposing a first conductive film as conductive material in a recess-like groove formed in part of the ferromagnetic material, disposing a non-magnetic insulating material in the groove containing the conductive film and then lapping the surface above the groove and the rest of the surface to make flush with each other. The dimension of the stepped portion 8 of the lamination of films formed on the ferromagnetic substrate, such as the second conductive film 4, the non-magnetic and insulating film 5 and the magnetic film 6, can be extremely reduced compared to the prior art arrangement, thus eliminating the possibility of an electric short-circuit between the first conductive film and the second conductive film 4 or the breakage of the second conductive film.

In addition, with the first conductive film formed in the groove formed in the ferromagnetic substrate, Joule heat produced in the first conductive film is transmitted into the substrate. However, since the ferromagnetic substrate usually has a very large thickness as compared to the conductive film and thus has great heat capacity, the Joule heat produced in the first conductive film hardly affects the magnetic properites of the substrate and also has less influences upon the ferromagnetic film. Further, changer in the characteristics of the first conductive film itself, for instance changes in its resistivity, caused by the afore-mentioned Joule heat is extremely reduced.

Further, the second conductive film, the non-magnetic and insulating film and so forth are formed on the ferromagnetic substrate having the recess-like groove, the distance $l$ between the magnetic film and the ferromagnetic material within the head can be effectively increased, so that it is possible to reduce leakage of magnetic flux between the magnetic film and the ferromagnetic material and thus increase the efficiency of the magnetic head.

Furthermore, as a method of giving a d-c bias field to the element in a magnetoresistive type magnetic head, a d-c current may be caused to flow in the first conductive film formed in the recess-like groove in the ferromagnetic substrate to thereby give the d-c bias field to the magnetoresistive effect element which is disposed on the ferromagnetic substrate having the recess-like groove to extend substantially parallel to the groove 2a.

With this method the problems of Joule heat produced in the conductive film can be sufficiently solved as mentioned above. Further, the depth $d$ of the groove and the thickness of the first conductive film may be controlled in the manufacturing stage so as to control the d-c current flowing through the conductive film at the time of operating the magnetic head. By so doing, it is possible to provide an optimum d-c bias field to the element.

Further, in the method of manufacture of the magnetic head according to the invention, the method of forming the recess-like groove and the bottom in the ferromagnetic substrate may comprise the steps of forming a metal film having good adhesion property with respect to the substrate on the substrate, forming it into a pattern of a desired shape and forming the aforementioned groove and bottom by using the metal film having the aforementioned pattern as a mask for etching the ferromagnetic substrate. In this way, the groove and bottom can be formed readily and with high precision by means of very simple techniques, and also it is possible to obtain sufficient improvements over the precision problems involved in mechanical processing or the deterioration problem of magnetic characteristics of the ferromagnetic substrate, which problems were involved in the working process in the case of other prior art methods.

Further, since conductive glass is used to fill the recess-like groove formed in part of the ferromagnetic substrate and is then lapped together with the ferromagnetic substrate so as to make its surface and the surface of the substrate flush with each other, it is possible to obtain a plane of very high precision. In addition, since the boundary area between the conductive glass and ferromagnetic substrate on which area the lamination of films is provided is made smooth and free from irregularities, the afore-mentioned problems of breakage of the second conductive film and so forth can be solved.

We claim:
1. A magnetic head comprising;
   a ferromagnetic substrate,
   a groove formed in part of said ferromagnetic substrate,
   a filler filled in said groove, said filler containing a conductive material,
   a ferromagnetic layer provided in a region extending over the top area of said groove,
   a magnetic gap formed between said ferromagnetic substrate and said ferromagnetic layer on one side of said groove, and
   a magnetic coupling provided between said ferromagnetic substrate and said ferromagnetic layer formed on the other side of said groove,
   said magnetic gap and said magnetic coupling constituting a magnetic core of said magnetic head.

2. A magnetic head according to claim 1, wherein said filler containing said conductive material is a conductive glass, and said magnetic head further comprises an insulating layer formed between said conductive glass and said ferromagnetic layer.

3. A magnetic head according to claim 1, wherein said conductive material is constituted by a non-magnetic conductive material and an insulator.

4. A magnetic head according to claim 1, wherein said ferromagnetic layer constitutes a magnetoresistive element.

5. A magnetic head according to claim 1, wherein a plurality of ferromagnetic layers are formed in a row and in the same plane common to said ferromagnetic substrate, said groove being common to each said ferromagnetic layer.

6. A magnetic head according to claim 1, further comprising a magnetoresistive element provided over a surface of the portion of said groove and substantially parallel with said groove.